(12) United States Patent
Bonk et al.

(10) Patent No.: US 6,685,272 B1
(45) Date of Patent: Feb. 3, 2004

(54) SEAT ASSEMBLY WITH TUNABLE TIE BAR

(75) Inventors: Jeffery T. Bonk, Clinton Township, MI (US); David L. Robinson, Sterling Heights, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 10/288,237

(22) Filed: Nov. 5, 2002

(51) Int. Cl.[7] .............................. A47C 7/00; A47C 7/02
(52) U.S. Cl. .............................. 297/463.1; 297/440.21; 297/452.18
(58) Field of Search .................... 297/463.1, 452.18, 297/440.2, 440.21, 440.22, 440.24

(56) References Cited

U.S. PATENT DOCUMENTS

| | | | |
|---|---|---|---|
| 5,240,310 A | * | 8/1993 | Rink ..................... 297/452.18 |
| 5,269,589 A | * | 12/1993 | Brothers et al. .... 297/440.21 X |
| 5,711,577 A | * | 1/1998 | Whalen ............. 297/452.18 X |
| 5,918,943 A | * | 7/1999 | Mitschelen et al. .. 297/463.1 X |
| 6,170,898 B1 | * | 1/2001 | Cunningham, II et al. ....... 297/452.18 X |
| 6,543,855 B2 | * | 4/2003 | Bruck .................... 297/440.21 |
| 2003/0038524 A1 | * | 2/2003 | Bruck .................... 297/452.18 |

FOREIGN PATENT DOCUMENTS

| | | | | |
|---|---|---|---|---|
| DE | 42 09 391 A1 | * | 10/1992 | ............ 297/452.18 |
| JP | 63097442 A | * | 4/1988 | ............ 297/440.2 |

* cited by examiner

Primary Examiner—Rodney B. White
(74) Attorney, Agent, or Firm—Harness, Dickey & Pierce, P.L.C.

(57) ABSTRACT

A seat assembly having a tunable tie bar is provided and includes a main pivot and a housing operably supporting the tie bar. The housing is fixedly attached to a seatback of the seat assembly and includes C-shaped members fixedly joined together to provide a space in which the tie bar is disposed. The tie bar is fixedly attached to the housing and is in engagement with the main pivot, whereby the tie bar reacts against the main pivot to provide the seatback with sufficient support. The tie bar serves to strengthen the housing and ultimately provide the seatback with sufficient strength to support an occupant and the accompanying seatbelt loads associated with a seat-mounted retractor assembly. The tie bar is tunable between different seating applications and as such, allows the housing to be used in various seating applications and does not require extensive design and tooling for each application.

22 Claims, 4 Drawing Sheets

SEAT ASSEMBLY WITH TUNABLE TIE BAR

FIELD OF THE INVENTION

The present invention relates to seat assemblies and, more particularly, to a support structure for a seat assembly.

BACKGROUND OF THE INVENTION

Seat assemblies, such as those used in vehicles, generally include a support structure interconnected between a seatback and a seat bottom for strengthening the seat assembly and providing support to an occupant. Many seat assemblies further include a mounting location integrally formed of the support structure for fixedly attaching a seatbelt retractor assembly thereto. Attaching a retractor assembly directly to the support structure of a seat assembly enhances occupant comfort and improves passenger compartment aesthetics. For example, mounting the seatbelt retractor to a seat assembly improves occupant comfort as the relationship of the seatbelt to the occupant remains constant throughout a range of angular adjustments of the seatback relative to the seat bottom. In addition to appearance and occupant comfort, mounting the retractor assembly directly to the seat assembly reduces assembly time and provides manufacturing flexibility. For example, vehicles such as convertibles, which generally do not have an upwardly extending B-pillar, do not include a convenient location on which to mount the retractor assembly, but can be manufactured with a seat assembly having an integrated retractor assembly.

In such an arrangement, the structure of the seat assembly must be of sufficient strength to accommodate the potentially high loads that may be generated as a result of vehicle deceleration from impact, severe braking, or the like. In these situations, the seatback plays a role as many seatbelt assemblies are shoulder mounted requiring mounting on an upper portion of the seatback. Alternatively, some seatbelt assemblies mount the retractor assembly to the seat bottom or other vehicle structure while still routing seatbelt webbing through the seatback to provide a shoulder-type restraint integral with the seatback. In either situation, loading of a shoulder-mounted seatbelt assembly causes a force to be applied at the interface of the seatbelt and the seatback under deceleration of the vehicle.

The force applied to the seatback is typically transmitted through the seatback structure to the seat bottom and ultimately to the structure of the vehicle through a pivotal connection of the seatback and the seat bottom. For shoulder-mounted seatbelt assemblies the force is magnified due to the moment arm extending from the seatback pivot to the point at which the seatbelt loads the seatback. As such, the seatback structure must be strong enough to transmit the generally high loads resulting from vehicle deceleration while also accommodating articulation of the seatback relative to the seat bottom.

Known seat assemblies providing for attachment of a seat belt retractor assembly to a vehicle seat suffer from the disadvantage of not efficiently and effectively transferring deceleration loads received by the seatback to the vehicle structure. More specifically, known designs for structured seat assemblies have been unable to fully retain the operation features demanded by consumers without requiring complex arrangements for pivotally mounting the seatback to the seat bottom. Further, known seat assemblies require a seat structure specific to each application, including design time and tooling for each independent application. While functionally acceptable, these complex arrangements are often weight prohibitive, cost prohibitive, or both.

Therefore, a seat assembly having a structure capable of pivotably supporting a seatback relative a seat bottom while providing enough strength to support a seatbelt assembly and the loads associated therewith is desirable in the industry. Furthermore, providing a seatback structure capable of adjustment and modification for use in various seating applications and varying vehicle seat designs while minimizing design time and tooling investment is also desirable.

SUMMARY OF THE INVENTION

Accordingly, the present invention provides a seat assembly with a tunable tie bar including a housing operably supporting the tie bar and a main pivot for interaction with the tie bar under a loading condition. The housing is fixedly attached to a seatback of the seat assembly and includes first and second C-shaped members fixedly joined together to form the housing and provide a space therebetween in which the tie bar is disposed. The housing further includes an extension for receiving the main pivot, whereby the main pivot receives a seat structure from a seat bottom and provides for relative rotation between the seatback and the seat bottom. The tie bar is an elongate support arm having a U-shaped extension and attachment apertures disposed along its length. The tie bar is fixedly attached to the housing and is in engagement with the main pivot, whereby the U-shaped extension reacts against the main pivot to provide the seatback with sufficient strength.

The tie bar is tunable for different seating applications by adjusting the material properties of the bar, varying the stiffness of the bar by varying the number of apertures formed thereon, or by modifying the interaction of the U-shaped extension and the main pivot. As such, the tunable tie bar allows the use of a common housing in various seating applications and does not require design and tooling of a new housing for each application.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
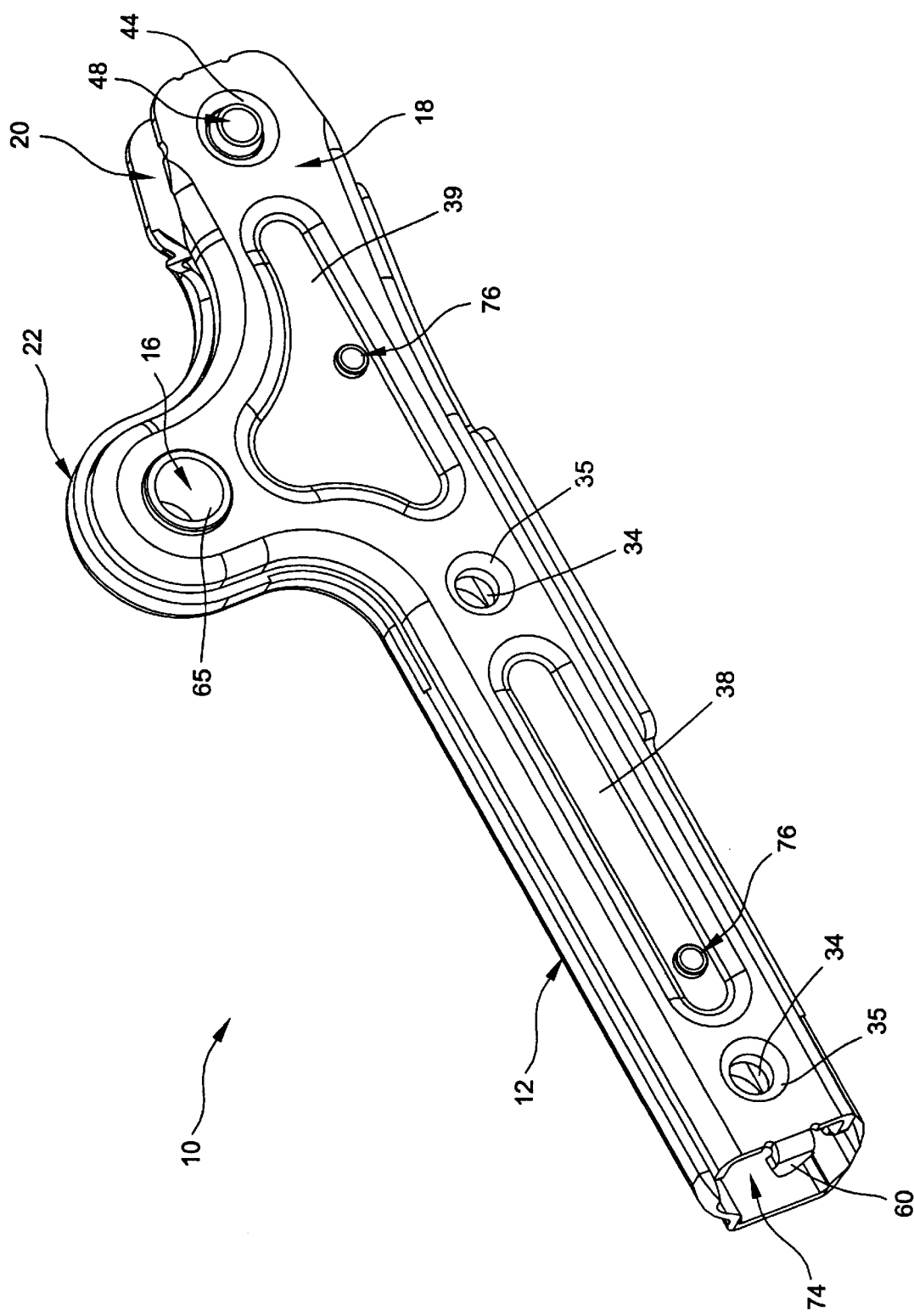
FIG. 1 is a perspective view of a seatback support structure in accordance with the principals of the present invention.

The following description of the preferred embodiments is merely exemplary in nature and is in no way intended to limit the invention, its application, or uses.

With reference to the drawings, a seat support structure 10 is provided and includes a housing 12, a tie bar 14, and a main pivot 16. The tie bar 14 is in abutting engagement with the main pivot 16 and serves to strengthen the housing 12. The housing includes first and second housing plates 18,20, between which the tie bar 14 and main pivot 16 are supported.

Figure 2:
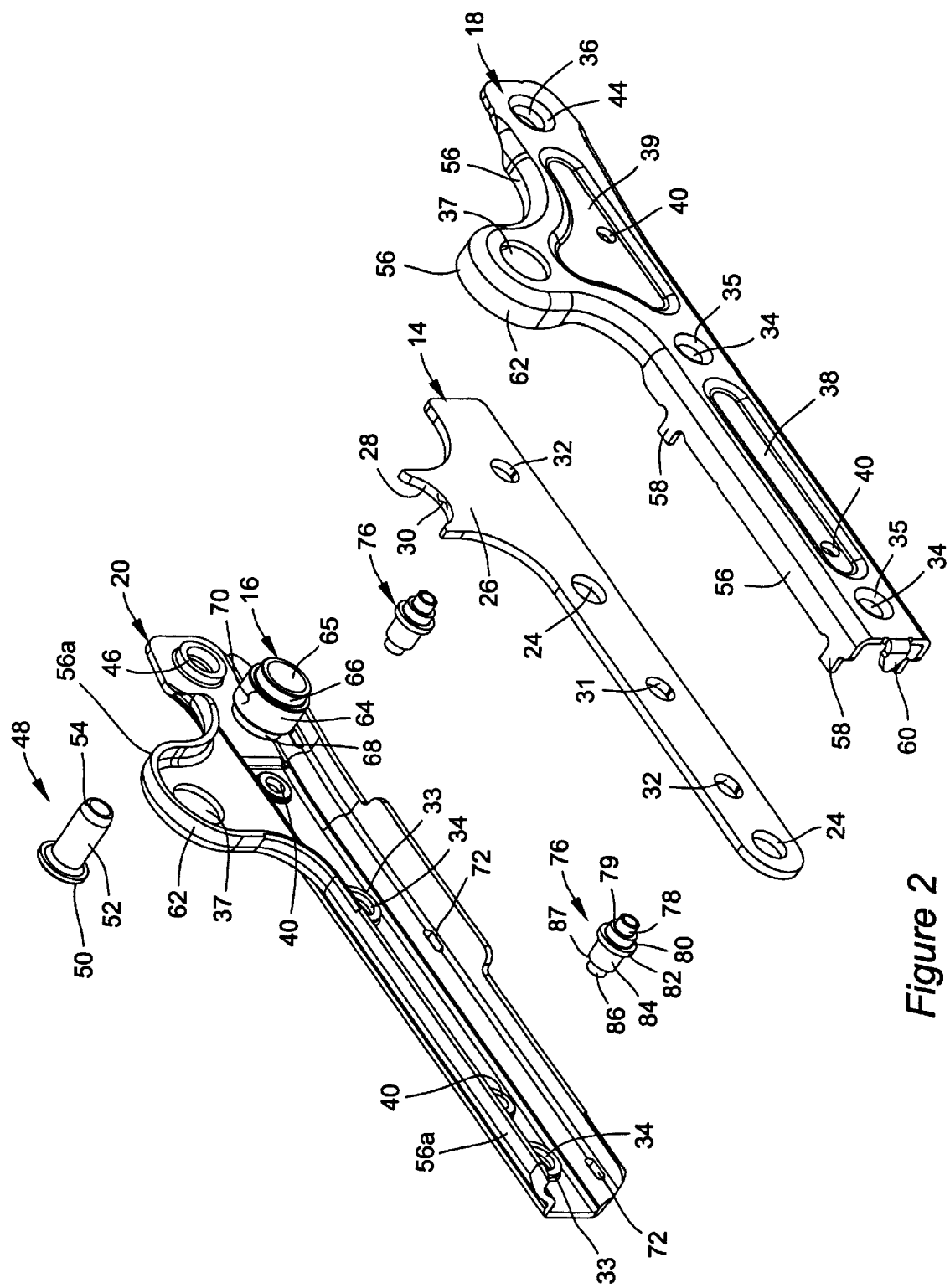
FIG. 2 is an exploded view of the seatback support structure of FIG. 1.
Figure 3:
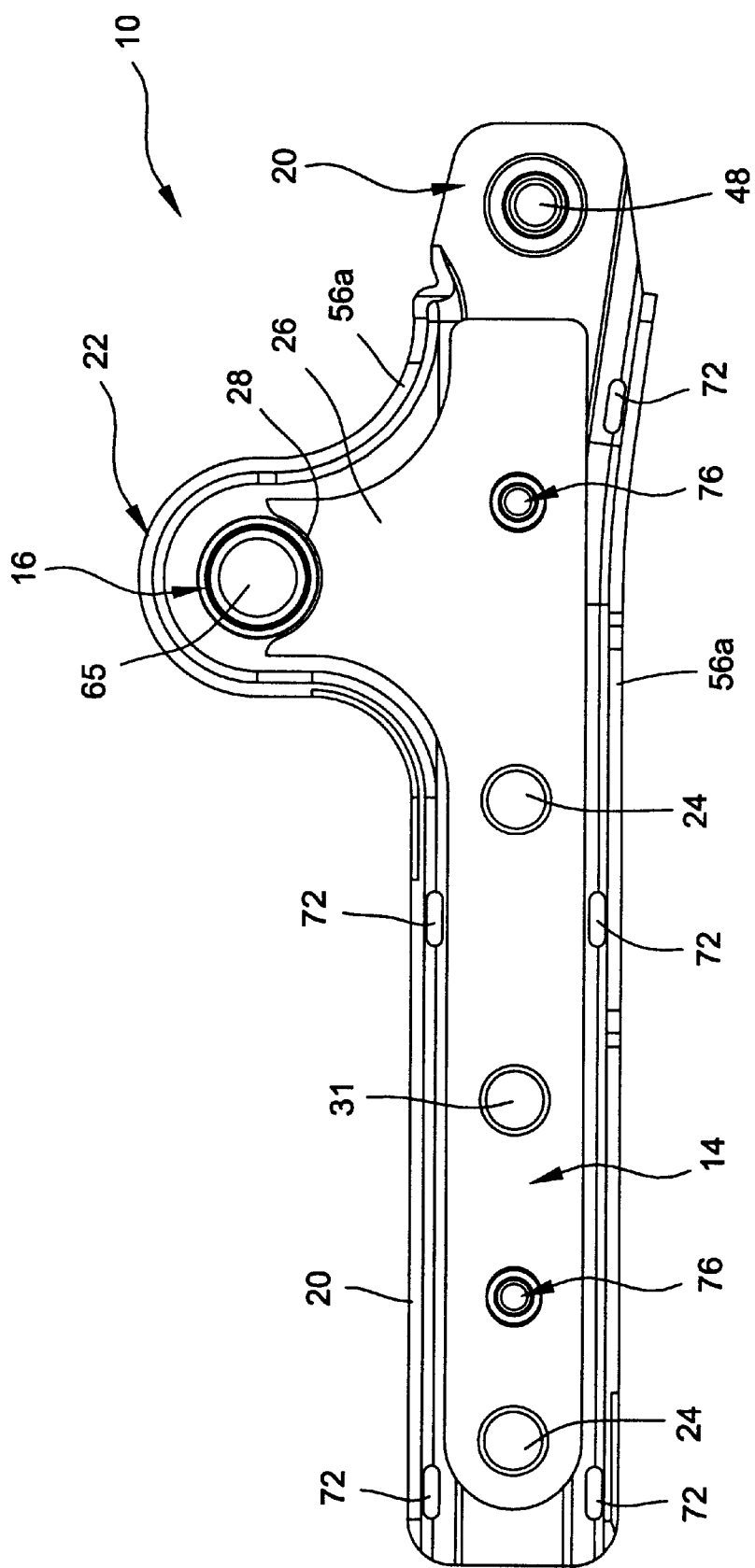
FIG. 3 is a side elevational view of the seatback support structure with part of a housing removed to show the internal workings of the seatback support structure.

The tie bar 14 is an elongate member operably supported by the housing 12 and includes attachment apertures 24 and an extension 26. The extension 26 includes a recess 28 having an arcuate surface and extends from the tie bar 14 at the second end as best shown in FIG. 2. The recess 28 includes a reaction surface 30 for mating engagement with the main pivot 16, as will be discussed further below. The tie bar 14 further includes attachment apertures 32 for attachment to the housing 12 and optional adjustment apertures 31 for adjusting the overall strength of the tie bar 14.

The housing 12 is an elongate member and includes the first and second housing plates 18,20, and an extension 22. The first housing plate 18 is a generally C-shaped member having a first portion of the extension 22 integrally formed therewith. The first housing plate 18 includes a series of attachment apertures 34 and first and second pivot apertures 36,37. The attachment apertures 34 include a recess 35 for receiving the head of a fastener (not shown) such that as the fastener is received by the attachment aperture 34 the head does not extend beyond an outer surface of the first housing plate 18. In one embodiment, the attachment apertures 34 receive a fastener to fixedly attach the housing 12 directly to a seatback. Alternatively, the attachment apertures 34 receive a fastener to fixedly attach the housing 12 to the frame of a seatback. In either situation, providing the housing 12 with a generally smooth outer surface prevents the housing 12 from snagging on the internal workings of a seatback and causing damage. In addition, the attachment apertures 34 include a flange 33 extending on an inner surface of the first housing plate 18 to strengthen the attachment apertures 34 and prevent deformation thereof.

The first pivot aperture 36 is disposed generally at the base of the extension 22 and includes a recess 44 and a flange 46 for interaction with a pivot 48. The pivot 48 includes a head 50 and a cylindrical body 52 as best shown in FIG. 2. The pivot 48 is received by second housing plate 20 having the head 50 disposed thereon while the first pivot aperture 36 of the first housing plate 18 receives the cylindrical body 52 including a tapered leading edge 54 to facilitate insertion into the first pivot aperture 36. While the second housing plate 20 is disclosed as receiving the cylindrical body 52 and the head 50, it should be understood that the first pivot aperture 36 could alternatively receive the head 50 and should be considered within the scope of the present invention. In either situation, the head 50 is received by the recess 44 to provide an outer surface of the housing 12 with a generally smooth outer surface.

The first housing plate 18 further includes first and second recesses 38,39 having attachment apertures 40 formed therein and a flange 56 generally surrounding the perimeter of the first housing plate 18. The flange 56 extends from the first housing plate 18 and includes attachment posts 58 and a tab 60. The flange 56 extends generally around the perimeter of the first housing plate 18 with the exception of an area surrounding the first pivot aperture 36 and an area on either side of the tab 60, as best shown in FIG. 1. The flange 56 is removed from the area surrounding the first pivot aperture 36 so as to provide clearance for rotation of the housing 12, as will be discussed further below.

With particular reference to FIG. 2, the second housing plate 20 is shown having a second portion of the extension 22, a series of attachment apertures 34, first and second pivot apertures 36,37, and a flange 56a. In view of the substantial similarity in structure of the first housing plate 18 with the second housing plate 20, like reference numerals are used hereinafter and in the drawings to identify like components while like reference numerals containing letter extensions are used to identify those components that have been modified. Because the first housing plate 18 is substantially similar to the second housing plate 20, the description of like components is forgone, whereby modified and new components are described herein below.

The flange 56a extends from the second housing plate 20 for mating engagement with the flange 56 of the first housing plate 18. The flange 56a is removed at one end of the housing 12 in an area surrounding the first pivot aperture 36 and at a second end as best shown in FIG. 1. The second housing plate 20 further includes a series of slots 72 for receiving the attachment posts 58 of the first housing plate 20. The attachment posts 58 guide the first housing plate 18 into mating engagement with the second housing plate 20 and further help to fixedly hold the first and second housing plates 18,20 in a fixed relationship to prevent relative rotation therebetween. A recess 74 is formed by the interaction of flange 56 and flange 56a and extends longitudinally through the housing 12 as best shown in FIG. 1. The recess 74 is open at a first end around the first pivot 36 and at a second end near tab 60. The tie bar 14 is disposed within recess 74 and is held in a fixed relationship thereto by a pair of rivets 76.

The rives 76 include first, second, third, fourth, and fifth cylindrical sections 78,80,82,84,86. The first cylindrical section 78 is received by attachment aperture 40 of the first housing plate 18. The second cylindrical section 80 is disposed adjacent the first cylindrical section 78 and includes a larger diameter than that of the first cylindrical section 78, thereby forming a first ridge 79. The first ridge 79 abuts an inner surface of the first housing plate 18 and as such determines the depth that the first cylindrical section 78 is inserted into the attachment aperture 40. The third cylindrical section 82 is disposed between the second and fourth cylindrical sections 80,84 and includes a larger diameter than that of both the second and fourth cylindrical sections 80,84. The fourth cylindrical section 84 is disposed between the third and fifth cylindrical sections 82,86 and includes a larger diameter than that of the fifth cylindrical section 86, thereby forming a second ridge 87. The fifth cylindrical section 86 is received by the attachment aperture 40 of the second housing plate 20 such that the second ridge 87 abuts an inner surface of the second housing plate 20, thereby determining the depth that the fifth cylindrical section 86 is inserted into the attachment aperture 40.

The first and second ridges 78,87 serve as a spacer between the first and second housing plates 18,20, thereby defining the width of the recess 74. The second cylindrical section 80 is received by the attachment aperture 32 of the tie bar 14 to fixedly attach the tie bar 14 to the housing 12. The third cylindrical section 82 cooperates with an inner surface of the first housing plate 18 to fixedly hold the tie bar 14 therebetween and prevent movement of the tie bar 14 along the second cylindrical section 80. As previously mentioned, the first and fifth cylindrical sections 78,86 are received by attachment apertures 40 of the first and second housing plates 18,20. In this manner, a portion of the first and fifth cylindrical sections 78,86 extend from the attachment aperture 40 and are received by the recesses 38,39 to prevent the first and fifth cylindrical sections 78,86 from extending beyond an outer surface of the housing 12.

It should be noted that the recesses 38,39 are designed to incorporate different locations of rivets 76 on the tie bar 14. Specifically, as the length of the tie bar 14 is adjusted for different seating applications, it is necessary to provide attachment to the housing and accommodate the changing location of the attachment apertures 32. To prevent the need for new housing 12 tooling for each specific seating application, the recesses 38,39 are large enough so that any change in the location of the attachment apertures 32 on the tie bar 14 is accommodated by the housing 12, as best shown in FIG. 2.

The extension 22 includes the second pivot aperture 37 and an arcuate surface 62. The second pivot aperture 37 fixedly receives the main pivot 16 for interaction with the tie bar 14. The main pivot 16 includes a central cylindrical section 64 flanked by first and second cylindrical sections 66,68 having a bore 65 formed therethrough. The first and second cylindrical sections 66,68 are received by the first and second housing plates 18,20 to fixedly attach the main pivot 16 thereto, while central cylindrical section 64 acts as a spacer between the first and second housing plates 18,20 and further includes a reaction surface 70 for interaction with the extension 26 of the tie bar 14. In one embodiment, the seat support structure 10 is pivotably supported by a seat frame in a seatback having a seat bottom attached thereto. In this manner, the central cylindrical section 64 receives a seat structure of the seat bottom such that the seatback pivots relative the seat bottom about the bore 65 of the central cylindrical section 64.

Figure 4:
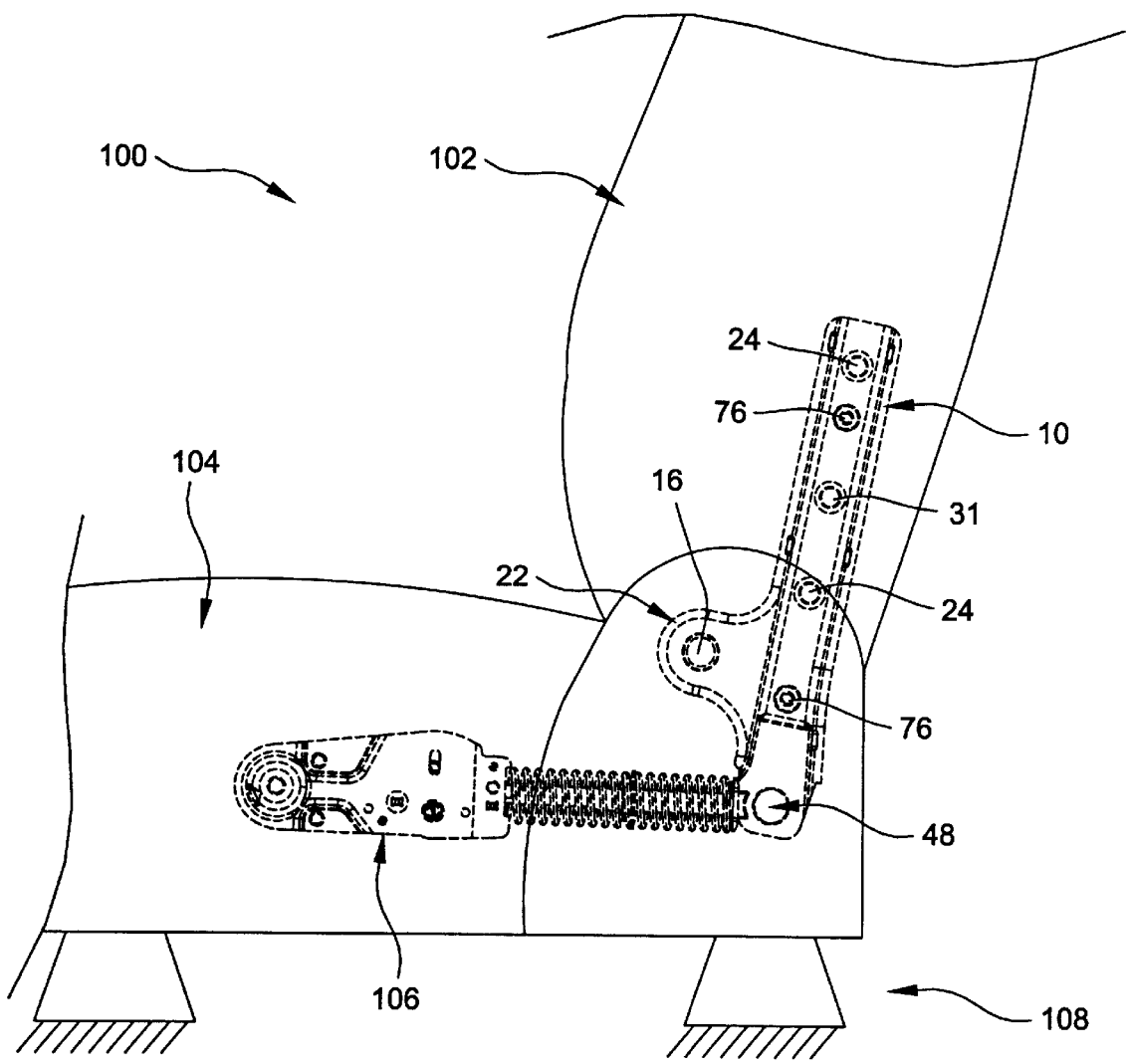
FIG. 4 is a side view of the seatback support structure in a seat assembly.

With reference to FIG. 4, the operation of the seat support structure 10 will be described in detail. In one embodiment, the seat support structure 10 is fixedly mounted to a vehicle seat assembly 100. The vehicle seat assembly 100 includes a seatback 102, a seat bottom 104, and a recliner mechanism 106. The seat support structure 10 can be either mounted directly to the frame (not shown) of a seatback 102 or integrally formed therewith.

The seatback 102 is pivotably supported by the seat bottom 104 about the main pivot 16. Specifically, the seat bottom 104 is received by the bore 65 of the main pivot 16 and as such permits the seatback 102 to rotate relative the seat bottom 104 about the bore 65. To selectively rotate the seatback 102 relative the seat bottom 104, a recliner mechanism 106 is provided and is received by pivot 48 to selectively apply a force to the housing 12 causing the seatback 102 to rotate about the main pivot 16. More particularly, the recliner mechanism 106 locks the seatback 102 in an angular relationship relative to the seat bottom 104 and prevents movement therebetween in a latched position and allows rotation of the seatback 102 in an unlatched position.

When the recliner mechanism 106 is in the unlatched position, the seatback 102 is permitted to rotate relative the seat bottom 104 and will do so under a force applied to the seatback 102 either from an occupant or an internal spring (not shown) depending on the direction of the force and the design of the recliner mechanism 106. In the latched position, the recliner mechanism 106 prevents rotation of the seatback 102 and ensures that the angular relationship of the seatback 102 to the seat bottom 104 is maintained. In this manner, an external force applied to the seatback 102 either by an occupant or a seat-mounted retractor assembly (not shown) causes a load to be applied through the seatback to the recliner mechanism 106 and ultimately to the structure of a vehicle 108.

The seat support structure 10 provides the seatback 102 with a means for transmitting the externally applied load to a structure of a vehicle 108 without deforming the seatback 102. As a load is applied to the seatback 102, the extension 26 of the tie bar 14 reacts against the main pivot 16 and provides the housing 12 with adequate stiffness to resist bending of the housing 12 and ultimately the seatback 102. In this manner, the energy associated with the load is transmitted from the seatback 102 to the housing 12 and eventually to the structure of a vehicle 108. By transmitting the energy to the vehicle structure 108, the integrity of the seat assembly 100 is maintained and can perform as designed to protect the occupant under a deceleration condition.

In one embodiment, the tie bar 14 is provided with a plurality of adjustment apertures 31 to adjust the overall stiffness of the tie bar 14. As previously discussed, the stiffness of the tie bar 14 dictates the strength of the housing 12 and ultimately the strength of the seatback 102. By providing the tie bar 14 with additional apertures, the tie bar 14 can be adjusted or "tuned" to its particular application without having to alter the housing 12. As can be appreciated, various seat assemblies have varying requirements with respect to seatback 102 stiffness due to the different applications of vehicle seat assemblies 100.

In another embodiment, the tie bar 14 reacts against the main pivot 16 and is designed to deform under a predetermined load to help absorb energy caused by the loading of the vehicle seat assembly 100. Again, adjustment apertures 31 may be employed in conjunction with a deformable extension 26 to provide the desired stiffness of the seatback 102. It should be understood that any combination of material selection, material thickness, number of apertures, and length of the tie bar 14 may be used in combination to adjust the overall stiffness of the tie bar 14. By providing the tie bar 14 with the aforementioned flexibility, the housing 12 can be used interchangeably with various seat assemblies 100, thereby reducing design and manufacturing costs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seatback support structure for use in a motor vehicle seat, comprising:
   a housing including an aperture formed therethrough;
   a main pivot supported by and coaxially disposed with said aperture of said housing; and
   a tie bar fixedly received by said housing and including an extension in abutting engagement with said main pivot, said tie bar being adjustable to provide a desired stiffness to said housing.

2. The seatback support structure of claim 1, wherein said extension includes generally U-shaped recess for mating engagement with said main pivot.

3. The seatback support structure of claim 1, wherein said tie bar includes a plurality of apertures, said apertures serving to attach said tie bar to said housing and to provide said tie bar with a desired stiffness.

4. The seatback support structure of claim 1, wherein said main pivot includes a central cylindrical section for engagement with said extension.

5. The seatback support structure of claim 1, wherein said housing includes an extension having said aperture formed therethrough.

6. The seatback support structure of claim 5, wherein said extension of said tie bar is received by said extension of said housing.

7. The seatback support structure of claim 1, wherein said tie bar is fixedly attached to said housing by a plurality of rivets.

8. The seatback support structure of claim 7, wherein said housing includes a series of recesses for receiving said rivets such that said rivets do not extend outwardly from an external surface of said housing.

9. The seatback support structure of claim 1, wherein said housing accommodates varying sized tie bars.

10. A seat assembly, comprising:
   a seat bottom;
   a seatback operably connected to said seat bottom;
   a first seat frame fixedly attached to said seatback having a support structure including:
      a housing having a first aperture formed therethrough;
      a main pivot supported by and coaxially disposed with said first aperture of said housing; and
      a tie bar fixedly received by said housing and including an extension in abutting engagement with said main pivot, said tie bar being adjustable to provide a desired stiffness to said housing.

11. The seat assembly of claim 10, wherein said seat bottom includes a second seat frame, said second seat frame received by said main pivot such that said seatback rotates relative said seat bottom about said main pivot.

12. The seat assembly of claim 10, wherein said housing includes a second aperture formed through said housing and said tie bar, said second aperture receiving a first rivet for mounting said housing to said first seat frame.

13. The seat assembly of claim 10, further comprising a recliner mechanism, said recliner mechanism rotatably mounted to said housing by a second rivet, said second rivet rotatably supported by a third aperture of said housing.

14. The seat assembly of claim 10, wherein said housing includes an extension having said first aperture formed therethrough.

15. The seat assembly of claim 14, wherein said extension of said tie bar is received by said extension of said housing.

16. The seat assembly of claim 14, wherein said extension is disposed at a predetermined distance from said housing to provide clearance for pivotal movement of said setback relative said seat bottom.

17. The seatback support structure of claim 10, wherein said tie bar is fixedly attached to said housing by a plurality of rivets.

18. The seatback support structure of claim 17, wherein said housing includes a series of recesses for receiving said rivets such that said rivets do not extend outwardly from an external surface of said housing.

19. The seatback support structure of claim 10, wherein said housing accommodates varying sized tie bars.

20. The seatback support structure of claim 10, wherein said housing includes a first and second housing plate, said first housing plate fixedly attached to said second housing plate.

21. The seatback support structure of claim 20, wherein said first and second housing plate cooperate to form a recess extending along the length of said housing.

22. The seatback support structure of claim 20, wherein said tie bar is disposed between said first and second housing plates.

* * * * *